(12) United States Patent
Shao et al.

(10) Patent No.: US 9,329,676 B2
(45) Date of Patent: May 3, 2016

(54) CONTROL METHOD AND ELECTRONIC DEVICE

(71) Applicants: Beijing Lenovo Software Ltd., Beijing (CN); Lenovo (Beijing) Limited, Beijing (CN)

(72) Inventors: Xiaoting Shao, Beijing (CN); Haisheng Xu, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 184 days.

(21) Appl. No.: 14/190,347

(22) Filed: Feb. 26, 2014

(65) Prior Publication Data
US 2014/0244272 A1 Aug. 28, 2014

(30) Foreign Application Priority Data
Feb. 27, 2013 (CN) .......................... 2013 1 0062098

(51) Int. Cl.
*G10L 17/22* (2013.01)
*G06F 3/01* (2006.01)
*G10L 15/22* (2006.01)

(52) U.S. Cl.
CPC .. *G06F 3/01* (2013.01); *G10L 15/22* (2013.01)

(58) Field of Classification Search
CPC .. A61M 2230/005; A61M 15/00; A61B 5/08; A61B 5/74; A61B 7/003
USPC .................... 704/270, 246, 251, 275, E15.04; 381/122; 40/124.02; 715/702, 728; 600/529
See application file for complete search history.

(56) References Cited

U.S. PATENT DOCUMENTS 6,594,632 B1 * 7/2003 White ........................... 704/270
2008/0319333 A1 * 12/2008 Gavish et al. ................. 600/529

* cited by examiner

*Primary Examiner* — Charlotte M Baker
(74) *Attorney, Agent, or Firm* — Westman, Champlin & Koehler, P.A.

(57) ABSTRACT

The present invention discloses a control method and an electronic device, which are capable of solving the technical problem in the prior art that it is not rapid enough when controlling a voice recognition engine to enter an operating state. The control method is applied in an electronic device which comprises a voice recognition engine and comprises or is connected to a microphone, wherein the method comprises: acquiring first airflow information collected by the microphone; determining whether the first airflow information satisfies a first preset condition; and controlling the voice recognition engine to enter a second state when the first airflow information satisfies the first preset condition.

26 Claims, 3 Drawing Sheets

CONTROL METHOD AND ELECTRONIC DEVICE

CROSS-REFERENCE TO RELATED APPLICATION

This Application claims the benefit and priority of a foreign application filed in China as Application No. 201310062098.9 on Feb. 27, 2013, all of which is incorporated herein by reference.

TECHNICAL FIELD

The present invention relates to the field of artificial intelligence, and in particular, to a control method and an electronic device.

BACKGROUND

With the continuous development of science technologies, electronic technologies develop rapidly, and the types of the electronic products are increasing, for example, mobile phones, notebook computers, all-in-one machines etc., occur. People enjoy various conveniences brought about by the development of the science technologies.

With the development of the electronic devices, the corresponding input modes thereof are increasing, for example, mouse input, keyboard input, voice input etc., occur. The voice input, among other things, is popular with more and more users since the operation is convenient and rapid. When an electronic device is in a standby state, a voice recognition engine corresponding to the electronic device typically is in an off state. In such case, the voice recognition engine is normally started in response to a long-press operation on a preset button in the prior art.

The inventors of the present application found that at least the following technical problems exist in the prior art in the process of implementing the technical solutions of the embodiments of the present application.

As it needs to control the voice recognition engine to enter an operating state in response to a long-press operation on a preset button in the prior art, there exists a technical problem that it is not rapid enough and it is also not intuitive enough, which influences the user experience.

SUMMARY

The embodiments of the present invention provide a control method and an electronic device, which are capable of solving the technical problem in the prior art that it is not rapid enough when controlling a voice recognition engine to enter an operating state.

In an aspect, an embodiment of the present application provides a control method applied in an electronic device which comprises a voice recognition engine and comprises or is connected to a microphone, the method comprising:

acquiring first airflow information collected by the microphone;

determining whether the first airflow information satisfies a first preset condition; and controlling the voice recognition engine to enter a second state from a first state when the first airflow information satisfies the first preset condition, wherein power consumption of the voice recognition engine in the first state is lower than power consumption of the voice recognition engine in the second state.

Alternatively, determining whether the first airflow information satisfies a first preset condition comprises:

determining whether the first airflow information is airflow information generated by a first user using the electronic device blowing towards the microphone.

Alternatively, determining whether the first airflow information is the airflow information generated by a first user using the electronic device blowing towards the microphone comprises:

determining whether a distance between the mouth of the first user and the microphone is less than a first preset threshold; or determining whether there is an operation of holding and moving the electronic device within a preset time period before the first airflow information has been acquired.

Alternatively, determining whether the first airflow information is the airflow information generated by a first user using the electronic device blowing towards the microphone comprises:

determining whether a first airflow intensity corresponding to the first airflow information is larger than a preset airflow intensity; or determining whether a first duration corresponding to the first airflow information is longer than a preset duration.

Alternatively, determining whether the first airflow information is the airflow information generated by a first user using the electronic device blowing towards the microphone further comprises:

determining whether a first airflow intensity corresponding to the first airflow information is larger than a preset airflow intensity; and determining whether a first duration of the first airflow intensity is longer than a preset duration when the first airflow intensity is larger than the preset airflow intensity.

Alternatively, after controlling the voice recognition engine to enter the second state from the first state, the method further comprises:

determining whether the voice recognition engine is in an enabled state, wherein when the voice recognition engine is in the enabled state, a function module on the device side that cooperates with the voice recognition engine to enable the voice recognition function of the voice recognition engine is in an operating state; and generating first prompt information to inform the first user that the electronic device can be controlled by a voice instruction when the operating state is the enabled state.

Alternatively, the first prompt information comprises prompt information of first airflow voice included in the first airflow information played through a speaker of the electronic device.

Alternatively, after controlling the voice recognition engine to enter the second state, the method further comprises:

determining whether the voice recognition engine is in an enabled state, wherein when the voice recognition engine is in the enabled state, a function module on the device side that cooperates with the voice recognition engine to enable the voice recognition function of the voice recognition engine is in an operating state; and generating second prompt information to inform the first user that the electronic device can not be controlled by a voice control instruction when the operating state is not the enabled state.

Alternatively, when the electronic device is in a screen lock state, before or after controlling the voice recognition engine to enter the second state from the first state, the method further comprises:

controlling the electronic device to enter an unlocked state from the screen lock state.

Alternatively, after controlling the voice recognition engine to enter the second state from the first state, the method further comprises:

determining whether the voice recognition engine is in the second state; and generating third prompt information for informing that the voice recognition engine is in the second state when the voice recognition engine is in the second state.

In an aspect, an embodiment of the present application provides a method of processing information applied in an electronic device which comprises a voice recognition engine and comprises or is connected to a microphone, wherein the voice recognition engine comprises a first state and a second state, power consumption of the voice recognition engine in the first state being lower than power consumption of the voice recognition engine in the second state, the method comprising:

determining whether the microphone collects second airflow information;

determining whether the voice recognition engine is in the second state when the second airflow information is collected; and generating fourth prompt information for informing that the voice recognition engine is in the second state when the voice recognition engine is in the second state.

Alternatively, after determining whether the voice recognition engine is in the second state, the method further comprises:

controlling the voice recognition engine to enter the second state when the voice recognition engine is not in the second state.

Alternatively, controlling the voice recognition engine to enter the second state further comprises:

determining whether the electronic device receives a first operation of touching a preset button; and controlling the voice recognition engine to enter the second state when the first operation is received.

Alternatively, controlling the voice recognition engine to enter the second state further comprises:

determining whether the electronic device detects first airflow information which satisfies a first preset condition; and controlling the voice recognition engine to enter the second state when the first airflow information is detected.

In an aspect, an embodiment of the present application provides an electronic device which comprises a voice recognition engine and comprises or is connected to a microphone, the electronic device further comprising:

an acquisition chip configured to acquire first airflow information collected by the microphone;

a first determination chip configured to determine whether the first airflow information satisfies a first preset condition; and a first control chip configured to control the voice recognition engine to enter a second state from a first state when the first airflow information satisfies the first preset condition, wherein power consumption of the voice recognition engine in the first state is lower than power consumption of the voice recognition engine in the second state.

Alternatively, the first determination chip is further configured to: determine whether the first airflow information is airflow information generated by a first user using the electronic device blowing towards the microphone.

Alternatively, the first determination chip is further configured to:

determine whether a distance between the mouth of the first user and the microphone is less than a first preset threshold; or determine whether there is an operation of holding and moving the electronic device within a preset time period before the first airflow information has been acquired.

Alternatively, the first determination chip is further configured to:

determine whether a first airflow intensity corresponding to the first airflow information is larger than a preset airflow intensity; or determine whether a first duration corresponding to the first airflow information is longer than a preset duration.

Alternatively, the first determination chip further comprises:

a first determination sub-chip configured to determine whether a first airflow intensity corresponding to the first airflow information is larger than a preset airflow intensity; and a second determination sub-chip configured to determine whether a first duration of the first airflow intensity is longer than a preset duration when the first airflow intensity is larger than the preset airflow intensity.

Alternatively, the electronic device further comprises:

a second determination chip configured to determine whether the voice recognition engine is in an enabled state after the voice recognition engine is controlled to enter the second state, wherein when the voice recognition engine is in the enabled state, a function module on the device side that cooperates with the voice recognition engine to enable the voice recognition function of the voice recognition engine is in an operating state; and a first generation chip configured to generate first prompt information to inform the first user that the electronic device can be controlled by a voice instruction when the operating state is the enabled state.

Alternatively, the first prompt information comprises prompt information of first airflow voice included in the first airflow information played through a speaker of the electronic device.

Alternatively, the electronic device further comprises:

a third determination chip configured to determine whether the voice recognition engine is in an enabled state after the voice recognition engine is controlled to enter the second state, wherein when the voice recognition engine is in the enabled state, a function module on the device side that cooperates with the voice recognition engine to enable the voice recognition function of the voice recognition engine is in an operating state; and a second generation chip configured to generate second prompt information to inform the first user that the electronic device can not be controlled by a voice control instruction when the operating state is not the enabled state.

Alternatively, when the electronic device is in a screen lock state, the electronic device further comprises:

a second control chip configured to control the electronic device to enter an unlocked state from the screen lock state before or after the voice recognition engine is controlled to enter the second state.

Alternatively, the electronic device further comprises:

a fourth determination chip configured to determine whether the voice recognition engine is in the second state after the voice recognition engine is controlled to enter the second state from the first state; and a third generation chip configured to generate third prompt information for informing that the voice recognition engine is in the second state when the voice recognition engine is in the second state.

In an aspect, an embodiment of the present application provides an electronic device which comprises a voice recognition engine and comprises or is connected to a microphone, wherein the voice recognition engine comprises a first state and a second state, power consumption of the voice recognition engine in the first state being lower than power consumption of the voice recognition engine in the second state, the electronic device further comprising:

a fifth determination chip configured to determine whether the microphone collects second airflow information;

a sixth determination chip configured to determine whether the voice recognition engine is in the second state when the second airflow information is collected; and a fourth generation chip configured to generate fourth prompt information for informing that the voice recognition engine is in the second state when the voice recognition engine is in the second state.

Alternatively, the electronic device further comprises:

a third control chip configured to control the voice recognition engine to enter the second state when the voice recognition engine is not in the second state, after determining whether the voice recognition engine is in the second state.

Alternatively, the third control chip comprises:

a third determination sub-chip configured to determine whether the electronic device receives a first operation of touching a preset button; and a first control sub-chip configured to control the voice recognition engine to enter the second state when the first operation is received.

Alternatively, the third control chip comprises:

a fourth determination sub-chip configured to determine whether the electronic device detects first airflow information which satisfies a first preset condition; and a second control sub-chip configured to control the voice recognition engine to enter the second state when the first airflow information is detected.

The one or more technical solutions provided in the embodiments of the present application at least comprise the following technical effects or advantages.

(1) In the embodiments of the present application, the technical solution of collecting first airflow information by the microphone and then controlling the voice recognition engine to enter a second state when it is determined that the first airflow information satisfies the first preset condition is utilized. The technical effect of starting the voice recognition engine more rapidly is achieved since the voice recognition engine can be controlled to enter the second state only by means of the airflow.

In addition, in normal cases, before using the voice recognition engine, the user will blow toward the microphone to determine whether the microphone is in good condition. Therefore, it is more intuitive to control the voice recognition engine by means of airflow, thus enhancing the user experience.

(2) In the embodiments of the present application, determining whether the first airflow information satisfies a first preset condition primarily comprises determining whether the first airflow information is the airflow information generated by a first user blowing towards the microphone, and thus the technical effect of preventing from generating a false response is achieved.

(3) In the embodiments of the present application, there are a variety of methods to determine whether the first airflow information is the airflow information generated by a first user using the electronic device blowing towards the microphone. For example, it is determined whether a distance between the mouth of the first user and the microphone is less than a first preset threshold, or it is determined whether there is an operation of holding and moving the electronic device within a preset time period before the first airflow information has been acquired. Thus, the technical effect that the methods of determining whether the first airflow information is the airflow information generated by the first user can be flexibly selected is achieved, and the technical effect of preventing a false response is also achieved.

(4) In the embodiments of the present application, there are a variety of methods to determine whether the first airflow information is the airflow information generated by blowing towards the microphone. For example, it is determined whether a first airflow intensity corresponding to the first airflow information is larger than a preset airflow intensity, or it is determined whether a first duration corresponding to the first airflow information is longer than a preset duration, or it is firstly determined whether a first airflow intensity corresponding to the first airflow information is larger than a preset airflow intensity, and then it is determined whether a first duration of the first airflow intensity is longer than a preset duration or whether the first airflow information includes voice information etc., if the first airflow intensity is larger than the preset airflow intensity. The technical effect that the methods of determining whether the first airflow information is the airflow information generated by blowing can be flexibly selected is achieved.

(5) In the embodiments of the present application, after the voice recognition engine is controlled to enter the second state, it will further be determined whether the voice recognition engine is in an enabled state, wherein different prompt information is generated respectively based on the voice recognition engine being in an enabled state or in a disabled state. Thus, the technical effect of being able to prevent from generating invalid voice information is achieved, thereby enhancing the user experience.

For example, although the voice recognition engine is in the second state, it may be the case that the electronic device is not connected to the network or the signal of the network is not in good condition and the voice recognition database used by the electronic device needs to be read from a cloud server. In such cases, although the voice recognition engine is in the second state, the voice information generated by the user can not be recognized by the voice recognition engine. Therefore, in such cases, the operating state of the voice recognition engine is the disabled state, and thus it may inform the user by generating prompt information to prevent the user from generating invalid voice information, which otherwise will result in a low user experience.

(6) In the embodiments of the present application, before or after controlling the voice recognition engine to enter the second state after the first airflow information has been detected, if the electronic device is in a screen lock state, the electronic device may further be controlled to enter an unlocked state from the screen lock state. In normal cases, the purpose of the user controlling the voice recognition engine to enter the second state is to control the electronic device by means of voice control. Therefore, when the voice recognition engine is controlled to enter the second state, the unlock operation will be performed on the electronic device. In the embodiments of the present application, the electronic device may be controlled to enter the unlocked state without responding to an additional unlock operation of the user, the technical effect of controlling the electronic device more conveniently is thus achieved, thereby enhancing the user experience.

(7) In the embodiments of the present application, it may further be determined whether the voice recognition engine of the electronic device is in the second state, for example, an operating state when the first airflow information which satisfies the first preset condition is detected, and fourth prompt information is generated when the voice recognition engine is in the second state. In this way, it may accurately be determined whether the voice recognition engine is in the operating state, so as to prevent the user from generating voice information even when the voice recognition engine is in the non-operating state. The technical effect of controlling the voice recognition engine more accurately is achieved.

(8) In the embodiments of the present application, the voice recognition engine may further be controlled to enter the second state when it is determined that the voice recognition engine is in the first state, for example, an off state or a standby state. Because it is normally the case that the user wants to perform voice control on the electronic device when the first airflow information is detected, the technical effect of being more convenient for voice control is achieved.

DETAILED DESCRIPTION OF THE EMBODIMENTS

The embodiments of the present invention provide a control method and an electronic device, which are capable of solving the technical problem in the prior art that it is not rapid enough when controlling a voice recognition engine to enter an operating state.

In order to solve the above technical problem, the general concept of the technical solutions in the embodiments of the present application comprises:

acquiring first airflow information collected by a microphone, wherein the microphone may be internal to the electronic device itself, or may be an external microphone;

determining whether the first airflow information satisfies a first preset condition, for example, determining whether the first airflow information is airflow information generated by a first user using the electronic device blowing towards the microphone, wherein determining whether the first airflow information is the airflow information generated by the first user blowing primarily comprises: determining whether the first airflow information is the airflow information generated by the first user and whether the first airflow information is the airflow information generated by blowing towards the microphone; and controlling the voice recognition engine to enter a second state when the first airflow information satisfies the first preset condition; in addition, if the electronic device is in a screen lock state, the electronic device may further be controlled to enter an unlocked state from the screen lock state before or after controlling the voice recognition engine to enter the second state.

Since the voice recognition engine can be controlled to enter the second state only by means of the airflow according to the above solution, the technical effect of starting the voice recognition engine more rapidly is achieved.

In addition, in normal cases, the user will blow toward the microphone to determine whether the microphone is in good condition before using the voice recognition engine. Therefore, it is more intuitive to control the voice recognition engine by means of airflow, thereby enhancing the user experience.

In order to better understand the above technical solutions, the above technical solutions will be described below in detail in conjunction with accompanying drawings of the description and specific embodiments.

Embodiment One

Embodiment one of the present application provides a control method applied in an electronic device, which comprises a voice recognition engine and comprises or is connected to a microphone. The electronic device is for example a notebook computer, a mobile phone, a tablet computer, etc.

Figure 1:
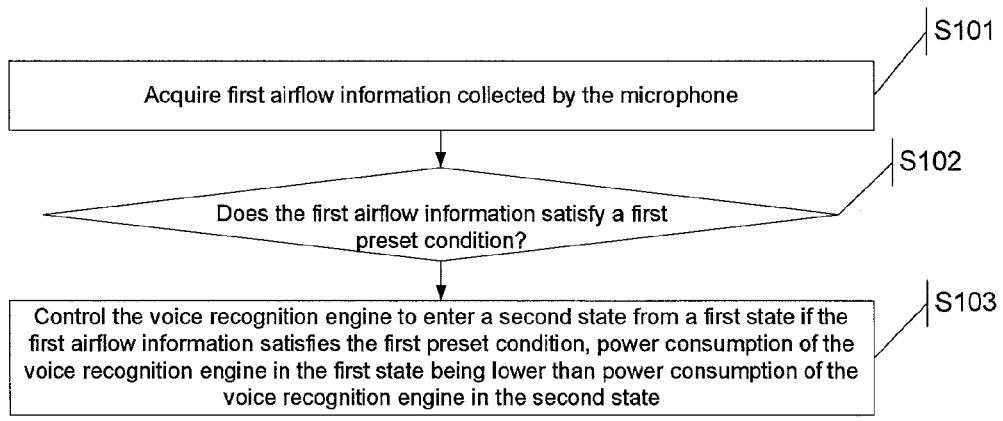
FIG. 1 is a flowchart of a control method according to embodiment one of the present application.

As shown in FIG. 1, the control method comprises the following steps.

Step S101: acquiring first airflow information collected by the microphone;

Step S102: determining whether the first airflow information satisfies a first preset condition; and Step S103: controlling the voice recognition engine to enter a second state from a first state when the first airflow information satisfies the first preset condition, wherein power consumption of the voice recognition engine in the first state is lower than power consumption of the voice recognition engine in the second state.

In step S101, the microphone may be in an operating state all the time, and thus, as long as there is the first airflow information, it will be detected by the microphone. However, in normal cases, in order to save the power consumption and prevent from collecting invalid airflow information, the microphone may be maintained to be in an off state when the electronic device is in a screen lock state, and the microphone is then controlled to be in the operating state in response to a preset operation. For example, a vibration sensor is set on the microphone. When the vibration sensor detects the airflow information generated by the user using the electronic device, the microphone is controlled to be in an on state, to detect the first airflow information. Of course, in a specific implementation, the preset operation may be an operation of clicking a button, an operation of swiping a preset gesture etc., which is not limited by the embodiments of the present application.

In step S101, the first airflow information is for example the airflow information generated by a first user using the electronic device blowing towards the microphone, or the airflow information generated by wind blowing etc.

In step S102, the first preset condition may be any condition, and the process of determining whether the first airflow information satisfies the first preset condition is different accordingly. For example, it is to determine whether the first airflow information is the airflow information generated by a first user using the electronic device blowing towards the microphone, or determine whether the first airflow information is the airflow information generated by wind blowing, etc. The embodiments of the present application do not limit what kind of preset condition the first preset condition is.

As a preferable embodiment, determining whether the first airflow information satisfies the first preset condition is to determine whether the first airflow information is the airflow information generated by a first user using the electronic device blowing towards the microphone, which primarily comprises the following two determinations: firstly, determining whether the first airflow information is the airflow information generated the first user; and secondly, determining whether the first airflow information is the airflow information generated by blowing.

It can be known from the above description that according to the embodiments of the present application, determining whether the first airflow information satisfies the first preset condition primarily comprises determining whether the first airflow information is the airflow information generated by the first user blowing towards the microphone, and thus the technical effect of preventing from generating a false response is achieved.

In an embodiment, there are a variety of methods to determine whether the first airflow information is the airflow information generated by the first user, two of which will be described below as examples. Of course, the specific implementation is not limited to the following two cases.

In a first method, it is determined whether a distance between the mouth of the first user and the microphone is less than a first preset threshold.

In a specific implementation, the first airflow information is the airflow information generated by the user, and the mouth of the user is close to the microphone. Therefore, it may be determined whether the first airflow information is the voice information generated by the first user by determining whether the distance between the mouth of the first user and the microphone is less than the first preset threshold, wherein the first distance threshold may be any distance threshold, for example, 1 cm, 2 cm, 5 cm etc.

In a specific implementation, it may be detected whether the distance between the mouth of the first user and the microphone is less than the first preset threshold in a variety of methods, for example, detecting through an infrared sensor, detecting through a proximity sensor, etc.

In a second method, it is determined whether there is an operation of holding and moving the electronic device within a preset time period before the first airflow information has been acquired.

In a specific implementation, when there is an operation of holding and moving the electronic device, it may be determined that the user wants to perform a certain operation on the electronic device, and therefore, it may be determined that the first airflow information is the airflow information generated by the user.

In a specific implementation, the operation of holding the electronic device may be detected by various sensors, for example, a capacitive sensor, an infrared sensor etc., and the operation of moving the electronic device may also be detected by various sensors, for example, an acceleration sensor, a gyroscope etc.

It can be known from the above description that according to the embodiments of the present application, there are a variety of methods to determine whether the first airflow information is the airflow information generated by a first user using the electronic device blowing towards the microphone. For example, it is determined whether a distance between the mouth of the first user and the microphone is less than a first preset threshold, or it is determined whether there is an operation of holding and moving the electronic device within a preset time period before the first airflow information has been acquired. Thus, the technical effect that the methods of determining whether the first airflow information is the airflow information generated by the first user can be flexibly selected is achieved, and the technical effect of preventing a false response is also achieved.

In a specific implementation, it may be determined whether the first airflow information is the airflow information generated by blowing in a variety of methods, three of which will be described below. Of course, the specific implementation is not limited to the following three methods.

In a first method, it is determined whether a first airflow intensity corresponding to the first airflow information is larger than a preset airflow intensity, or it is determined whether a first duration corresponding to the first airflow information is longer than a preset duration.

In a specific implementation, after the first airflow information is collected by the microphone, the first airflow intensity corresponding to the first airflow information may be detected by a detection apparatus, wherein the detection apparatus is for example, a vibration sensor, through which the mechanical quantity corresponding to the first airflow information may be converted into electricity quantity, and then the electricity quantity is measured to acquire a first airflow signal curve, which comprises the signal intensity and the time. The first airflow intensity may be determined based on the first airflow signal curve, wherein the first airflow intensity may be a highest value, a lowest value or an average value of intensities of signals in the first airflow signal curve. The embodiments of the present application do not limit which value in the first airflow signal curve the first airflow intensity is.

Alternatively, in a specific implementation, after acquiring the first airflow signal curve, the duration corresponding to the first airflow information may be determined, and when the duration corresponding to the first airflow information is longer than a preset duration, it is indicated that the first airflow information is the airflow information generated by blowing, wherein the preset duration may be any time, for example, 2 s, 4 s, 10 s etc., which is not limited by the embodiments of the present application.

Figure 2:
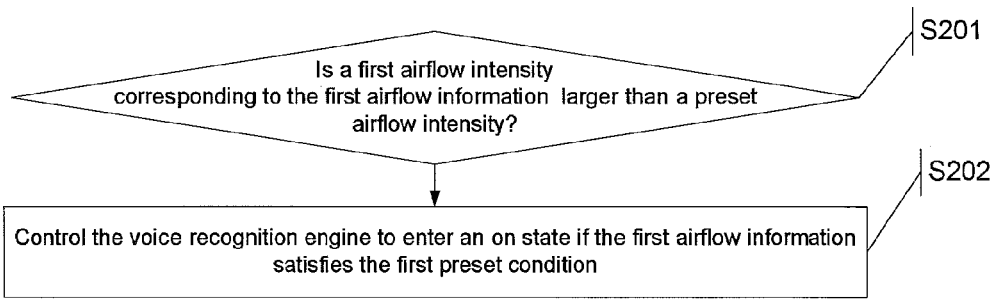
FIG. 2 is a flowchart of determining whether first airflow information is airflow information generated by blowing using the second method in the method according to embodiment one of the present application.

As shown in FIG. 2, a second method comprises the following steps:

Step S201: determining whether a first airflow intensity corresponding to the first airflow information is larger than a preset airflow intensity; and Step S202: determining whether a first duration of the first airflow intensity is longer than a preset duration when the first airflow intensity is larger than the preset airflow intensity.

In steps S201 and S202, after acquiring a first airflow signal curve corresponding to the first airflow information, at least one airflow segment with an airflow intensity being larger than the preset airflow intensity is acquired therefrom, then it is determined whether there is an airflow segment of the at least one airflow segment having a duration longer than the preset time threshold. If there is an airflow segment having a duration longer than the preset time threshold, it is indicated that the duration of the first airflow information is longer than the preset duration. If the first airflow information is voice information from the user, the airflow intensity of the first airflow information will vary with time. Therefore, it may be distinguished whether the first airflow information is the airflow information generated by a user blowing or the voice information generated by the user speaking.

In a third method, it is determined whether the first airflow information includes voice information.

In a specific implementation, it may be determined whether the first airflow information carries the voice information by a Voice Activity Detection (VAD) algorithm or a voice endpoint detection algorithm. If the first airflow information carries the voice information, it is indicated that the first airflow information is the voice information generated by the user speaking, while if the airflow information carries no voice information, it is indicated that the first airflow information is the voice information generated by the user blowing.

It can be known from the above description that according to the embodiments of the present application, there are a variety of methods to determine whether the first airflow information is the airflow information generated by blowing towards the microphone. For example, it is determined whether a first airflow intensity corresponding to the first airflow information is larger than a preset airflow intensity, or it is determined whether a first duration corresponding to the first airflow information is longer than a preset duration, or it is firstly determined whether a first airflow intensity corresponding to the first airflow information is larger than a preset airflow intensity, and then it is determined whether a first duration of the first airflow intensity is longer than a preset duration or whether the first airflow information includes voice information etc., if the first airflow intensity is larger than the preset airflow intensity. The technical effect that the methods of determining whether the first airflow information is the airflow information generated by blowing can be flexibly selected is achieved.

In step S103, the first state is for example, an off state, a standby state etc., and the second state is for example an operating state. In normal cases, in order to save power consumption, when there is no need to use the voice recognition engine, the voice recognition engine may be controlled to be in a low power consumption state such as the off state, the standby state etc. When it is determined that the user needs to use the voice recognition engine after the first airflow information is detected, the voice recognition engine is controlled to enter the second state.

Figure 3:
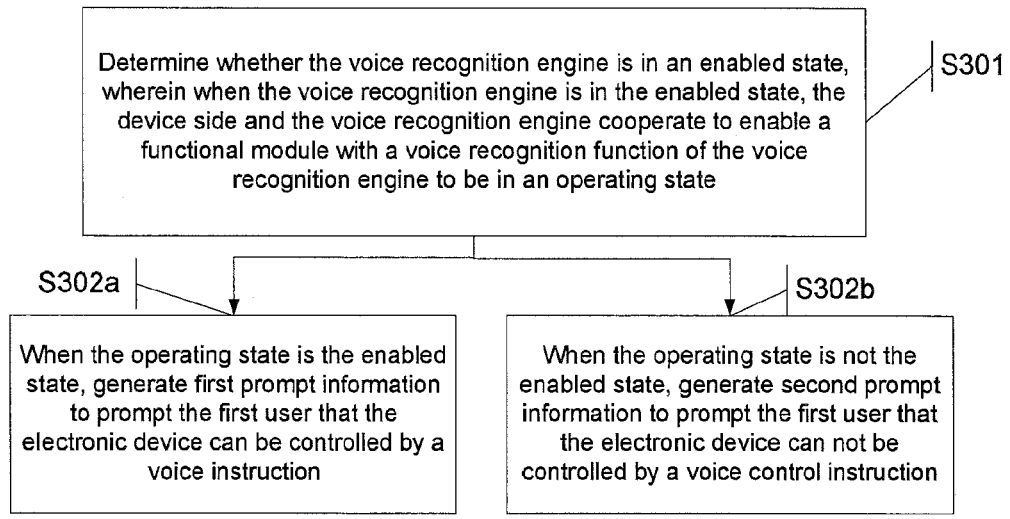
FIG. 3 is a flowchart of generating different prompt information based on whether the voice recognition engine is in an enabled state in the method according to embodiment one of the present application.

In a specific implementation, as shown in FIG. 3, after controlling the voice recognition engine to enter the second state from the first state, the method further comprises:

Step S301: determining whether the operating state of the voice recognition engine is an enabled state, wherein when the voice recognition engine is in the enabled state, a function module on the device side that cooperates with the voice recognition engine to enable the voice recognition function of the voice recognition engine is in an operating state;

Step S302a: generating first prompt information to inform the first user that the electronic device can be controlled by a voice instruction when the operating state is the enabled state; and Step S302b: generating second prompt information to inform the first user that the electronic device can not be controlled by a voice control instruction when the operating state is not the enabled state.

In a specific implementation, a voice recognition database corresponding to the voice recognition engine may be located locally at the electronic device, or may be located at a cloud server. In the case that the voice recognition database corresponding to the voice recognition engine is located at the cloud server, after controlling the voice recognition engine to enter the second state, the operating state of the voice recognition engine may be in an enabled state or in a disabled state, for example, when the electronic device is not connected to the network server, or the signal of the network is not in good condition etc. In such cases, although the voice recognition engine is in the second state, a function module cooperating with the voice recognition engine to enable the voice recognition function is not in an operating state, and therefore, the voice information input by the user can not be recognized. Thus, in such cases, the voice recognition engine is in a disabled state. Only if the function module cooperating with the voice recognition engine to enable the voice recognition function is in an operating state, the voice recognition engine may recognize the voice information. In such cases, the voice recognition engine may be in the enabled state.

Therefore, in order to prevent from generating an invalid voice control instruction, it is determined whether the operating state of the voice recognition engine is an enabled state in step S301. As for step S301 of determining whether the voice recognition engine is in the enabled state, it may be determined whether the operating state of the voice recognition engine is the enabled state by detecting the condition of the network connection.

In step S302a, the first prompt information may be any type of prompt information, for example, airflow prompt information, voice prompt information, character prompt etc.; wherein the airflow prompt information is for example the prompt information of the first airflow voice included in the first airflow information played through the speaker of the electronic device. In particular, after the speaker detects the first airflow information, the first airflow information is recoded. When it is determined that the voice recognition engine is in an enabled state, the first airflow voice in the first airflow information is played through the speaker of the electronic device, thus informing the user using the electronic device that the voice recognition engine of the electronic device is in the enabled state, and the electronic device can be controlled by a voice instruction.

In step S302b, the second prompt information may be any type of prompt information, except that the second prompt information is used to inform a thing different from the first prompt information. It may be the case that only the first prompt information is generated, or only the second prompt information is generated, or both the first prompt information and the second prompt information are generated. When both the first prompt information and the second prompt information are generated, the first prompt information and the second prompt information may be of the same type. For example, the first prompt information and the second prompt information both are airflow prompt information. Alternatively, the first prompt information and the second prompt information may be of different types. For example, the first prompt information is airflow prompt information, and the second prompt information is character prompt information.

It can be known from the above description that in the embodiments of the present application, after the voice recognition engine is controlled to enter the second state, it will further be determined whether the operating state of the voice recognition engine is an enabled state, wherein different prompt information is generated respectively based on the voice recognition engine being in an enabled state or in a disabled state. Thus, the technical effect of being able to prevent from generating invalid voice information is achieved, thereby enhancing the user experience.

In addition, in a specific implementation, when the electronic device is in a screen lock state, before or after the voice recognition engine is controlled to enter the second state, the method further comprises controlling the electronic device to enter an unlocked state from the screen lock state.

In a specific implementation, when the electronic device detects that the first airflow information satisfies the first preset condition, it may be determined that the first user wants to use the electronic device, and thus the electronic device is controlled to enter the unlocked state from the screen lock state. It may be the case that the electronic device is firstly controlled to enter the unlocked state from the screen lock state, and then the voice recognition engine is controlled to enter the second state; or the voice recognition engine is firstly controlled to enter the second state, and then the electronic device is controlled to enter the unlocked state from the screen lock state; or the electronic device is controlled to enter the unlocked state from the screen lock state while the voice recognition engine is controlled to enter the second state.

It can be known from the above description that in the embodiments of the present application, before or after controlling the voice recognition engine to enter the second state after the first airflow information has been detected, if the electronic device is in a screen lock state, the electronic device may further be controlled to enter an unlocked state from the screen lock state. In normal cases, the purpose of the user controlling the voice recognition engine to enter the second state is to control the electronic device by means of voice control. Therefore, when the voice recognition engine is controlled to enter the second state, the unlock operation will be performed on the electronic device. In the embodiments of the present application, the electronic device may be controlled to enter the unlocked state without responding to an additional unlock operation of the user, the technical effect of controlling the electronic device more conveniently is thus achieved, thereby enhancing the user experience.

In a specific implementation, after the voice recognition engine is controlled to enter the second state from the first state in step S103, the method further comprises: determining whether the voice recognition engine is in the second state; and generating third prompt information for informing that the voice recognition engine is in the second state when the voice recognition engine is in the second state.

In a specific implementation, when the voice recognition engine is controlled to enter the second state from the first state, there may be a delay, for example, 2 s, 3 s, 5 s etc.; or the voice recognition engine breaks down, and can not enter the second state. Therefore, in order to enable the user using the electronic device to confirm that the electronic device enters the second state, third prompt information may be generated after the electronic device enters the second state. The third prompt information may also be any prompt information, for example, airflow prompt information, voice prompt information etc., and the airflow prompt information is similar to the one described above, and thus will not be described again in detail.

Embodiment Two

Embodiment two of the present application provides a method of processing information, applied in an electronic device which comprises a voice recognition engine and comprises or is connected to a microphone, wherein the voice recognition engine comprises a first state and a second state, power consumption of the voice recognition engine in the first state being lower than power consumption of the voice recognition engine in the second state.

In a specific implementation, the electronic device is for example a tablet computer, a notebook computer, a mobile phone etc. The first state is for example a standby state, an off state etc.; and the second state is for example an operating state.

Figure 4:
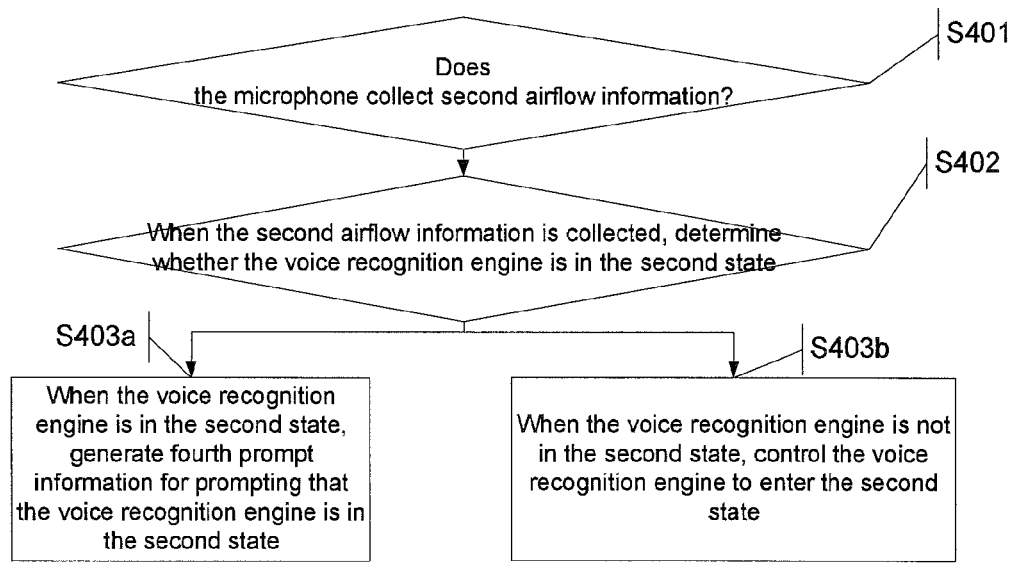
FIG. 4 is a flowchart of a method of processing information according to embodiment two of the present application.

As shown in FIG. 4, the method of processing information comprises the following steps:

Step S401: determining whether the microphone collects second airflow information;

Step S402: determining whether the voice recognition engine is in the second state when the second airflow information is collected; and Step S403a: generating fourth prompt information for informing that the voice recognition engine is in the second state when the voice recognition engine is in the second state.

In a specific implementation, after determining whether the voice recognition engine is in the second state in step S402, the method further comprises:

Step S403b: controlling the voice recognition engine to enter the second state when the voice recognition engine is not in the second state.

In step S401, the second airflow information may be any preset airflow information, for example, airflow information generated by a first user using the electronic device blowing toward the microphone, air flow information generated by wind blowing, etc. As a preferable embodiment, the second airflow information is airflow information generated by a first user blowing toward the microphone. As how to detect that the second airflow information is the airflow information generated by the first user blowing toward the microphone, it has been specifically described in embodiment one of the present application, and will not be described here again.

In step S402, it may be determined whether the voice recognition engine is in the second state by invoking an application program manager in the electronic device.

In step S403a, the fourth prompt information may also be any prompt information, for example, airflow prompt information, voice prompt information etc. The airflow prompt information is for example the prompt information of the second airflow voice included in the second airflow information played through the speaker of the electronic device. In particular, after the speaker detects the second airflow information, the second airflow information is recoded. When it is determined that the voice recognition engine is in the second state, the second airflow voice in the second airflow information is played through the speaker of the electronic device, thus informing the first user that the voice recognition engine can be used.

It can be known from the above description that in the embodiments of the present application, it may further be determined whether the voice recognition engine of the electronic device is in the second state, for example, an operating state, when the first airflow information which satisfies the first preset condition is detected, and fourth prompt information is generated when the voice recognition engine is in the second state. In this way, it may accurately be determined whether the voice recognition engine is in the operating state, so as to prevent the user from generating voice information even when the voice recognition engine is in the non-operating state. The technical effect of controlling the voice recognition engine more accurately is achieved.

In a specific implementation, when it is determined that the voice recognition engine is not in the second state in step S403b, fifth prompt information for informing that the voice recognition engine is not in the second state may also be generated. The fifth prompt information may be airflow prompt information, voice prompt information etc. In addition, in a specific implementation, it may be the case that only the fourth prompt information is generated, or only the fifth prompt information is generated, or both the fourth prompt information and the fifth prompt information are generated, which is not limited by the embodiments of the present application, as long as the fourth prompt information and the fifth prompt information are different.

In a specific implementation, the voice recognition engine may be controlled to enter the second state in a variety of methods in step S403b, two of which will be described below. Of course, the specific implementation is not limited to the following two cases.

In a first method, it is determined whether the electronic device receives a first operation of touching a preset button. When the first operation is received, the voice recognition engine is controlled to enter the second state. Specifically, a button is set on the electronic device, and the voice recognition engine is triggered manually to enter the second state by a click operation on the button of the first user.

In a second method, it is determined whether the electronic device detects first airflow information which satisfies a first preset condition; and when the first airflow information is detected, the voice recognition engine is controlled to enter the second state.

As how to control the voice recognition engine to enter the second state based on the first airflow information, it has been described in detail in embodiment one of the present application, and will not be described here again. The first airflow information and the second airflow information may be the same airflow information, or may be different airflow information, which is not limited by the embodiments of the present application.

It can be known from the above description that in the embodiments of the present application, the voice recognition engine may further be controlled to enter the second state when it is determined that the voice recognition engine is in the first state, for example, an off state or a standby state. Because it is normally the case that the user wants to perform voice control on the electronic device when the first airflow information is detected, the technical effect of being more convenient for voice control is achieved.

Embodiment Three

In order to enable those skilled in the art to understand the specific implementation of the control method according to embodiment one of the present application completely, embodiment three of the present application is provided to describe the control method which is described in embodiment one of the present application from the view of the user. In the present embodiment, the control method will be described by taking a mobile phone as an example of the electronic device.

At T1, user A takes out the mobile phone in a screen lock state and moves the mobile phone to his/her mouth.

At T2, the microphone of the mobile phone detects first airflow information.

An infrared sensor provided on the mobile phone detects that a distance between the microphone of the mobile phone and the mouth of user A is 2 cm. Herein, a first preset distance is 5 cm. Therefore, it is determined that the distance between the microphone and the mouth of user A is less than the first preset distance threshold, and it is determined that the first airflow information is the airflow information generated by user A.

At the same time, the mobile phone determines that the first airflow information includes no voice information by the VAD algorithm. Therefore, it is determined that the first airflow information is the airflow information generated by user A blowing, and thus the first airflow information satisfies a first preset condition of controlling the voice recognition engine of the mobile phone to enter the second state. Therefore, the voice recognition engine is controlled to enter the second state.

At the same time, the electronic device establishes a network connection with a cloud server. After establishment of the network connection, the electronic device detects signals of the network, and determines that the voice information can be recognized by the cloud server. The electronic device then generates airflow information to inform user A that the mobile phone can be controlled by voice information.

At the same time, the electronic device generates an unlock instruction to perform an unlock operation on the mobile phone.

Embodiment Four

In order to enable those skilled in the art to understand the specific implementation of the method of processing information in embodiment two of the present application completely, embodiment four of the present application is provided to describe the method of processing information which is described in embodiment two of the present application from the view of the user. In the present embodiment, the method of processing information will be described by taking a tablet computer as an example of the electronic device.

At T3, user B controls the tablet computer to enter an on state.

At T4, the tablet computer has been in the on state, and user B blows towards the microphone of the tablet computer to generate second airflow information. After detecting the second airflow information, the tablet computer determines that the second airflow information is the airflow information generated by user B blowing towards the microphone of the tablet computer, and then detects whether the voice recognition engine of the tablet computer is in an operating state.

The tablet computer detects that the voice recognition engine is in the operating state, and therefore plays a second airflow voice in the second airflow information through the speaker of the tablet computer, to inform user B that the voice recognition engine can be used.

At T5, user B does not use the tablet computer any longer, and thus the tablet computer enters a screen lock state, and controls the voice recognition engine to enter an off state.

At T6, user B picks up the tablet computer, and blows towards the microphone of the tablet computer. After detecting the airflow information corresponding to the blowing, the tablet computer detects whether the voice recognition engine is in an operating state. It determines that the voice recognition engine is not in the operating state, and therefore does not generate prompt information.

At T7, user B receives no fourth prompt information generated by the tablet computer, and therefore determines that the voice recognition engine is in an off state. He/She then continues to blow towards the microphone for a duration longer than 3 seconds. After detecting the airflow information of user B for a duration longer than 3 seconds, the tablet computer controls the voice recognition engine to enter an on state.

Embodiment Five

Based on the same inventive concept, embodiment five of the present application provides an electronic device, which comprises a voice recognition engine and comprises or is connected to a microphone.

Figure 5:
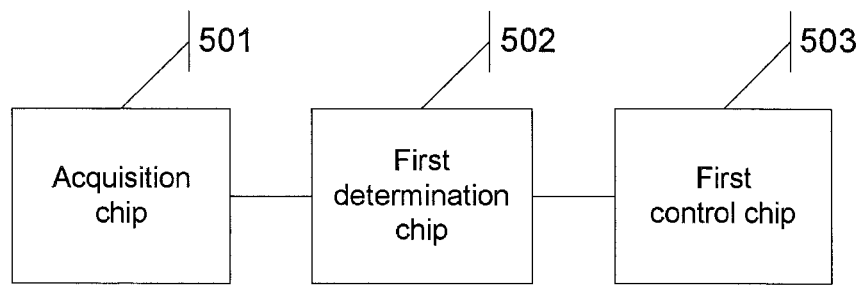
FIG. 5 is a structural diagram of an electronic device according to embodiment four of the present application.

As shown in FIG. 5, the electronic device further comprises the following units:

an acquisition chip 501 configured to acquire first airflow information collected by the microphone;

a first determination chip 502 configured to determine whether the first airflow information satisfies a first preset condition; and a first control chip 503 configured to control the voice recognition engine to enter a second state from a first state when the first airflow information satisfies the first preset condition, wherein power consumption of the voice recognition engine in the first state is lower than power consumption of the voice recognition engine in the second state.

In a specific implementation, when the first determination chip 502 determines whether the first airflow information satisfies the first preset condition, the first preset condition may be multiple preset conditions, and the function of the first determination chip which is used is different accordingly. For example, the first determination chip 502 is configured to determine whether the first airflow information is airflow information generated by a first user using the electronic device blowing towards the microphone; or the first determination chip 502 is configured to determine whether the first airflow information is airflow information generated by the wind etc. As a preferable embodiment, the first determination chip 502 is configured to determine whether the first airflow information is the airflow information generated by a first user using the electronic device blowing towards the microphone.

It can be known from the above description that in the embodiments of the present application, determining whether the first airflow information satisfies a first preset condition primarily comprises determining whether the first airflow information is the airflow information generated by a first user blowing towards the microphone, and thus the technical effect of preventing from generating a false response is achieved.

When the first determination chip 502 is configured to determine whether the first airflow information is the airflow information generated by a first user using the electronic device blowing towards the microphone, the first determination chip 502 primarily comprises two functions, the first one is to determine whether the first airflow information is the airflow information generated by the first user, and the second one is to determine whether the first airflow information is the airflow information generated by blowing.

When the first determination chip 502 is configured to determine whether the first airflow information is the airflow information generated by the first user, multiple determination methods may be used, two of which will be described below. Of course, the specific implementation is not limited to the following two cases.

In a first method, the first determination chip 502 is configured to determine whether a distance between the mouth of the first user and the microphone is less than a first preset threshold.

In a second method, the first determination chip 502 is configured to determine whether there is an operation of holding and moving the electronic device within a preset time period before the first airflow information has been acquired.

It can be known from the above description that in the embodiments of the present application, there are a variety of methods to determine whether the first airflow information is the airflow information generated by a first user using the electronic device blowing towards the microphone. For example, it is determined whether the distance between the mouth of the first user and the microphone is less than a first preset threshold, or it is determined whether there is an operation of holding and moving the electronic device within a preset time period before the first airflow information has been acquired. Thus, the technical effect that the methods of determining whether the first airflow information is the airflow information generated by the first user can be flexibly selected is achieved, and the technical effect of preventing a false response is also achieved.

When the first determination chip 502 is configured to determine whether the first airflow information is the airflow information generated by blowing, multiple determination methods may be used, three of which will be described below. Of course, the specific implementation is not limited to the following three cases.

In a first method, the first determination chip 502 is configured to determine whether a first airflow intensity corresponding to the first airflow information is larger than a preset airflow intensity.

In a second method, the first determination chip 502 is configured to determine whether a first duration corresponding to the first airflow information is longer than a preset duration.

In a third method, the first determination chip 502 further comprises:

a first determination sub-chip configured to determine whether a first airflow intensity corresponding to the first airflow information is larger than a preset airflow intensity;

a second determination sub-chip configured to determine whether a first duration of the first airflow intensity is longer than a preset duration when the first airflow intensity is larger than the preset airflow intensity.

It can be known from the above description that in the embodiments of the present application, there are a variety of methods to determine whether the first airflow information is the airflow information generated by blowing towards the microphone. For example, it is determined whether a first airflow intensity corresponding to the first airflow information is larger than a preset airflow intensity, or it is determined whether a first duration corresponding to the first airflow information is longer than a preset duration, or it is firstly determined whether a first airflow intensity corresponding to the first airflow information is larger than a preset airflow intensity, and then it is determined whether a first duration of the first airflow intensity is larger than a preset duration or whether the first airflow information includes voice information etc., if the first airflow intensity is larger than the preset airflow intensity. The technical effect that the methods of determining whether the first airflow information is the airflow information generated by blowing can be flexibly selected is achieved.

In a specific implementation, the electronic device further comprises:

a second determination chip configured to determine whether the voice recognition engine is in an enabled state after the voice recognition engine is controlled to enter the second state, wherein when the voice recognition engine is in the enabled state, a function module on the device side that cooperates with the voice recognition engine to enable the voice recognition function of the voice recognition engine is in an operating state; and a first generation chip configured to generate first prompt information to inform the first user that the electronic device can be controlled by a voice instruction when the operating state is the enabled state.

In a specific implementation, the first prompt information may be prompt information of first airflow voice included in the first airflow information played through a speaker of the electronic device.

In a specific implementation, the electronic device further comprises:

a third determination chip configured to determine whether the voice recognition engine is in an enabled state after the voice recognition engine is controlled to enter the second state, wherein when the voice recognition engine is in the enabled state, a function module on the device side that cooperates with the voice recognition engine to enable the voice recognition function of the voice recognition engine is in an operating state; and a second generation chip configured to generate second prompt information to inform the first user that the electronic device can not be controlled by a voice control instruction when the operating state is not the enabled state.

It can be known from the above description that in the embodiments of the present application, after the voice recognition engine is controlled to enter the second state, it will further be determined whether the operating state of the voice recognition engine is an enabled state, wherein different prompt information is generated respectively based on the voice recognition engine being in an enabled state or in a disabled state. Thus, the technical effect of being able to prevent from generating invalid voice information is achieved, thereby enhancing the user experience.

In a specific implementation, when the electronic device is in a screen lock state, the electronic device further comprises:

a second control chip configured to control the electronic device to enter an unlocked state from the screen lock state before or after controlling the voice recognition engine to enter the second state.

It can be known from the above description that in the embodiments of the present application, before or after controlling the voice recognition engine to enter the second state after the first airflow information has been detected, if the electronic device is in a screen lock state, the electronic device may further be controlled to enter an unlocked state from the screen lock state. In normal cases, the purpose of the user controlling the voice recognition engine to enter the second state is to control the electronic device by means of voice control. Therefore, when the voice recognition engine is controlled to enter the second state, the unlock operation will be performed on the electronic device. In the embodiments of the present application, the electronic device may be controlled to enter the unlocked state without responding to an additional unlock operation of the user, the technical effect of controlling the electronic device more conveniently is thus achieved, thereby enhancing the user experience.

In a specific implementation, the electronic device further comprises:

a fourth determination chip configured to determine whether the voice recognition engine is in the second state after the voice recognition engine is controlled to enter the second state from the first state; and a third generation chip configured to generate third prompt information for informing that the voice recognition engine is in the second state when the voice recognition engine is in the second state.

Although the electronic device described in embodiment five of the present application is the one utilized for implementing the control method according to embodiment one or three of the present application, those skilled in the art can appreciate the specific structure and variations of the electronic device described in embodiment five of the present application based on the control method described in embodiment one or embodiment three of the present application. Therefore, the electronic device will not be described here again in detail. All the electronic devices utilized for implementing the control method according to embodiment one or embodiment three of the present application by those skilled in the art fall within the scope to be protected by the application.

Embodiment Six

Based on the same inventive concept, embodiment six of the present application provides an electronic device, which comprises a voice recognition engine and comprises or is connected to a microphone, wherein the voice recognition engine comprises a first state and a second state, and power consumption of the voice recognition engine in the first state is lower than power consumption of the voice recognition engine in the second state.

Figure 6:
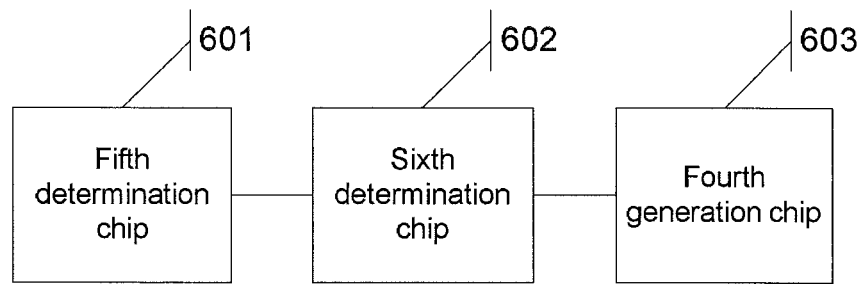
FIG. 6 is a structural diagram of an electronic device according to embodiment three of the present application.

As shown in FIG. 6, the electronic device specifically comprises:

a fifth determination chip 601 configured to determine whether the microphone collects second airflow information;

a sixth determination chip 602 configured to determine whether the voice recognition engine is in the second state when the second airflow information is collected; and a fourth generation chip 603 configured to generate fourth prompt information for informing that the voice recognition engine is in the second state when the voice recognition engine is in the second state.

It can be known from the above description that in the embodiments of the present application, it may further be determined whether the voice recognition engine of the electronic device is in the second state, for example, an operating state when the first airflow information which satisfies the first preset condition is detected, and fourth prompt information is generated when the voice recognition engine is in the second state. In this way, it may accurately be determined whether the voice recognition engine is in the operating state, so as to prevent the user from generating voice information even when the voice recognition engine is in the non-operating state. The technical effect of controlling the voice recognition engine more accurately is achieved.

In a specific implementation, the electronic device further comprises a third control chip configured to control the voice recognition engine to enter the second state when the voice recognition engine is not in the second state, after determining whether the voice recognition engine is in the second state.

In a specific implementation, the third control chip may control the voice recognition engine to enter the second state in a variety of methods, and accordingly, the function modules included in the third control chip are different. Two of the methods will be listed to be described below. Of course, the specific implementation is not limited to the following two cases.

In a first method, the third control chip specifically comprises:

a third determination sub-chip configured to determine whether the electronic device receives a first operation of touching a preset button; and a first control sub-chip configured to control the voice recognition engine to enter the second state when the first operation is received.

In s second method, the third control chip specifically comprises:

a fourth determination sub-chip configured to determine whether the electronic device detects first airflow information which satisfies a first preset condition; and a second control sub-chip configured to control the voice recognition engine to enter the second state when the first airflow information is detected.

It can be known from the above description that in the embodiments of the present application, the voice recognition engine may further be controlled to enter the second state when it is determined that the voice recognition engine is in the first state, for example, an off state or a standby state. Because it is normally the case that the user wants to perform voice control on the electronic device when the first airflow information is detected, the technical effect of being more convenient for voice control is achieved.

Although the electronic device described in embodiment six of the present application is the one utilized for implementing the method of processing information according to embodiment two or four of the present application, those skilled in the art may appreciate the specific structure and variations of the electronic device described in embodiment six of the present application based on the method of processing information described in embodiment two or embodiment four of the present application. Therefore, the electronic device will not be described here again in detail. All the electronic devices utilized for implementing the method of processing information according to embodiment two or embodiment four of the present application by those skilled in the art fall within the scope to be protected by the application.

The one or more technical solutions provided in the present application at least comprise the following technical effects or advantages:

(1) In the embodiments of the present application, the technical solution of collecting first airflow information by the microphone and then controlling the voice recognition engine to enter a second state when it is determined that the first airflow information satisfies the first preset condition is utilized. The technical effect of starting the voice recognition engine more rapidly is achieved since the voice recognition engine can be controlled to enter the second state only by means of the airflow.

In addition, in normal cases, before using the voice recognition engine, the user will blow toward the microphone to determine whether the microphone is in good condition. Therefore, it is more intuitive to control the voice recognition engine by means of airflow, thus enhancing the user experience.

(2) In the embodiments of the present application, determining whether the first airflow information satisfies a first preset condition primarily comprises determining whether the first airflow information is the airflow information generated by a first user blowing towards the microphone, and thus the technical effect of preventing from generating a false response is achieved.

(3) In the embodiments of the present application, there are a variety of methods to determine whether the first airflow information is the airflow information generated by a first user using the electronic device blowing towards the microphone. For example, it is determined whether a distance between the mouth of the first user and the microphone is less than a first preset threshold, or it is determined whether there is an operation of holding and moving the electronic device within a preset time period before the first airflow information has been acquired. Thus, the technical effect that the methods of determining whether the first airflow information is the airflow information generated by the first user can be flexibly selected is achieved, and the technical effect of preventing a false response is also achieved.

(4) In the embodiments of the present application, there are a variety of methods to determine whether the first airflow information is the airflow information generated by blowing towards the microphone. For example, it is determined whether a first airflow intensity corresponding to the first airflow information is larger than a preset airflow intensity, or it is determined whether a first duration corresponding to the first airflow information is longer than a preset duration, or it is firstly determined whether a first airflow intensity corresponding to the first airflow information is larger than a preset airflow intensity, and then it is determined whether a first duration of the first airflow intensity is longer than a preset duration or whether the first airflow information includes voice information etc., if the first airflow intensity is larger than the preset airflow intensity. The technical effect that the methods of determining whether the first airflow information is the airflow information generated by blowing can be flexibly selected is achieved.

(5) In the embodiments of the present application, after the voice recognition engine is controlled to enter the second state, it will further be determined whether the voice recognition engine is in an enabled state, wherein different prompt information is generated respectively based on the voice recognition engine being in an enabled state or in a disabled state. Thus, the technical effect of being able to prevent from generating invalid voice information is achieved, thereby enhancing the user experience.

For example, although the voice recognition engine is in the second state, it may be the case that the electronic device is not connected to the network or the signal of the network is not in good condition and the voice recognition database used by the electronic device needs to be read from a cloud server. In such cases, although the voice recognition engine is in the second state, the voice information generated by the user can not be recognized by the voice recognition engine. Therefore, in such cases, the operating state of the voice recognition engine is the disabled state, and thus it may inform the user by generating prompt information to prevent the user from generating invalid voice information, which otherwise will result in a low user experience.

(6) In the embodiments of the present application, before or after controlling the voice recognition engine to enter the second state after the first airflow information has been detected, if the electronic device is in a screen lock state, the electronic device may further be controlled to enter an unlocked state from the screen lock state. In normal cases, the purpose of the user controlling the voice recognition engine to enter the second state is to control the electronic device by means of voice control. Therefore, when the voice recognition engine is controlled to enter the second state, the unlock operation will be performed on the electronic device. In the embodiments of the present application, the electronic device may be controlled to enter the unlocked state without responding to an additional unlock operation of the user, the technical effect of controlling the electronic device more conveniently is thus achieved, thereby enhancing the user experience.

(7) In the embodiments of the present application, it may further be determined whether the voice recognition engine of the electronic device is in the second state, for example, an operating state, when the first airflow information which satisfies the first preset condition is detected, and fourth prompt information is generated when the voice recognition engine is in the second state. In this way, it may accurately be determined whether the voice recognition engine is in the operating state, so as to prevent the user from generating voice information even when the voice recognition engine is in the non-operating state. The technical effect of controlling the voice recognition engine more accurately is achieved.

(8) In the embodiments of the present application, the voice recognition engine may further be controlled to enter the second state when it is determined that the voice recognition engine is in the first state, for example, an off state or a standby state. Because it is normally the case that the user wants to perform voice control on the electronic device when the first airflow information is detected, the technical effect of being more convenient for voice control is achieved.

Although the preferable embodiments of the present application have been described, those skilled in the art may make additional changes and amendments to these embodiments upon reading the basic inventive concept. Therefore, the appended claims are intended to be construed as including preferable embodiments and all changes and amendments within the scope of the present application.

Obviously, those skilled in the art can make various modifications and variations to the present application without departing from the spirit and scope of the present application. Thus, if these modifications and variations of the present application belong to the scope of the claims of the present application and the equivalent technologies thereof, the present application is also intended to include these modifications and variations.

What is claimed is:

1. A control method, applied in an electronic device which comprises a voice recognition engine and comprises or is connected to a microphone, the method comprising:
    acquiring first airflow information collected by the microphone;
    determining whether the first airflow information satisfies a first preset condition; and
    controlling the voice recognition engine to enter a second state from a first state when the first airflow information satisfies the first preset condition, wherein power consumption of the voice recognition engine in the first state is lower than power consumption of the voice recognition engine in the second state,
    wherein, after controlling the voice recognition engine to enter the second state from the first state, the method further comprises:
        determining whether the voice recognition engine is in the second state; and
        generating third prompt information for informing that the voice recognition engine is in the second state when the voice recognition engine is in the second state.

2. The method according to claim 1, wherein determining whether the first airflow information satisfies a first preset condition comprises:
    determining whether the first airflow information is airflow information generated by a first user using the electronic device blowing towards the microphone.

3. The method according to claim 2, wherein determining whether the first airflow information is the airflow information generated by a first user using the electronic device blowing towards the microphone comprises:
    determining whether a distance between the mouth of the first user and the microphone is less than a first preset threshold; or
    determining whether there is an operation of holding and moving the electronic device within a preset time period before the first airflow information has been acquired.

4. The method according to claim 2, wherein determining whether the first airflow information is the airflow information generated by a first user using the electronic device blowing towards the microphone comprises:
    determining whether a first airflow intensity corresponding to the first airflow information is larger than a preset airflow intensity; or
    determining whether a first duration corresponding to the first airflow information is longer than a preset duration.

5. The method according to claim 2, wherein determining whether the first airflow information is the airflow information generated by a first user using the electronic device blowing towards the microphone further comprises:
    determining whether a first airflow intensity corresponding to the first airflow information is larger than a preset airflow intensity; and
    determining whether a first duration of the first airflow intensity is longer than a preset duration when the first airflow intensity is larger than the preset airflow intensity.

6. The method according to claim 1, wherein, after controlling the voice recognition engine to enter the second state, the method further comprises:
    determining whether the voice recognition engine is in an enabled state, wherein when the voice recognition engine is in the enabled state, a function module on the device side that cooperates with the voice recognition engine to enable the voice recognition function of the voice recognition engine is in an operating state; and
    generating first prompt information to inform the first user that the electronic device can be controlled by a voice instruction when the operating state is the enabled state.

7. The method according to claim 6, wherein, the first prompt information comprises prompt information of first airflow voice included in the first airflow information played through a speaker of the electronic device.

8. The method according to claim 1, wherein, after controlling the voice recognition engine to enter the second state from the first state, the method further comprises:
    determining whether the voice recognition engine is in an enabled state, wherein when the voice recognition engine is in the enabled state, a function module on the device side that cooperates with the voice recognition engine to enable the voice recognition function of the voice recognition engine is in an operating state; and
    generating second prompt information to inform the first user that the electronic device can not be controlled by a voice control instruction when the operating state is not the enabled state.

9. The method according to claim 1, wherein, when the electronic device is in a screen lock state, before or after controlling the voice recognition engine to enter the second state from the first state, the method further comprises:
    controlling the electronic device to enter an unlocked state from the screen lock state.

10. A method of processing information, applied in an electronic device which comprises a voice recognition engine and comprises or is connected to a microphone, wherein the voice recognition engine comprises a first state and a second state, power consumption of the voice recognition engine in the first state being lower than power consumption of the voice recognition engine in the second state, the method comprising:
    determining whether the microphone collects second airflow information;

determining whether the voice recognition engine is in the second state when the second airflow information is collected; and generating fourth prompt information for informing that the voice recognition engine is in the second state when the voice recognition engine is in the second state.

11. The method according to claim 10, wherein, after determining whether the voice recognition engine is in the second state, the method further comprises:

controlling the voice recognition engine to enter the second state when the voice recognition engine is not in the second state.

12. The method according to claim 11, wherein controlling the voice recognition engine to enter the second state further comprises:

determining whether the electronic device receives a first operation of touching a preset button; and controlling the voice recognition engine to enter the second state when the first operation is received.

13. The method according to claim 11, wherein controlling the voice recognition engine to enter the second state further comprises:

determining whether the electronic device detects first airflow information which satisfies a first preset condition; and controlling the voice recognition engine to enter the second state when the first airflow information is detected.

14. An electronic device which comprises a voice recognition engine and comprises or is connected to a microphone, the electronic device further comprising:

an acquisition chip configured to acquire first airflow information collected by the microphone;

a first determination chip configured to determine whether the first airflow information satisfies a first preset condition; and a first control chip configured to control the voice recognition engine to enter a second state from a first state when the first airflow information satisfies the first preset condition, wherein power consumption of the voice recognition engine in the first state is lower than power consumption of the voice recognition engine in the second state, wherein the electronic device further comprises:

a fourth determination chip configured to determine whether the voice recognition engine is in the second state after the voice recognition engine is controlled to enter the second state from the first state; and a third generation chip configured to generate third prompt information for informing that the engine recognition engine is in the second state when the voice recognition engine is in the second state.

15. The electronic device according to claim 14, wherein, when the electronic device is in a screen lock state, the electronic device further comprises:

a second control chip configured to control the electronic device to enter an unlocked state from the screen lock state before or after the voice recognition engine is controlled to enter the second state.

16. The electronic device according to claim 14, wherein the first determination chip is further configured to:

determine whether the first airflow information is airflow information generated by a first user using the electronic device blowing towards the microphone.

17. The electronic device according to claim 16, wherein the first determination chip is further configured to:

determine whether a distance between the mouth of the first user and the microphone is less than a first preset threshold; or determine whether there is an operation of holding and moving the electronic device within a preset time period before the first airflow information has been acquired.

18. The electronic device according to claim 16, wherein the first determination chip is further configured to:

determine whether a first airflow intensity corresponding to the first airflow information is larger than a preset airflow intensity; or determine whether a first duration corresponding to the first airflow information is longer than a preset duration.

19. The electronic device according to claim 16, wherein the first determination chip further comprises:

a first determination sub-chip configured to determine whether a first airflow intensity corresponding to the first airflow information is larger than a preset airflow intensity; and a second determination sub-chip configured to determine whether a first duration of the first airflow intensity is longer than a preset duration when the first airflow intensity is larger than the preset airflow intensity.

20. The electronic device according to claim 14, wherein the electronic device further comprises:

a second determination chip configured to determine whether the voice recognition engine is in an enabled state after the voice recognition engine is controlled to enter the second state, wherein when the voice recognition engine is in the enabled state, a function module on the device side that cooperates with the voice recognition engine to enable the voice recognition function of the voice recognition engine is in an operating state; and a first generation chip configured to generate first prompt information to inform the first user that the electronic device can be controlled by a voice instruction when the operating state is the enabled state.

21. The electronic device according to claim 20, wherein the first prompt information comprises promotion information of first airflow voice included in the first airflow information played through a speaker of the electronic device.

22. The electronic device according to claim 14, wherein the electronic device further comprises:

a third determination chip configured to determine whether the voice recognition engine is in an enabled state after the voice recognition engine is controlled to enter the second state, wherein when the voice recognition engine is in the enabled state, a function module on the device side that cooperates with the voice recognition engine to enable the voice recognition function of the voice recognition engine is in an operating state; and a second generation chip configured to generate second prompt information to inform the first user that the electronic device can not be controlled by a voice control instruction when the operating state is not the enabled state.

23. An electronic device which comprises a voice recognition engine and comprises or is connected to a microphone, wherein the voice recognition engine comprises a first state and a second state, power consumption of the voice recognition engine in the first state being lower than power consumption of the voice recognition engine in the second state, the electronic device further comprising:

a fifth determination chip configured to determine whether the microphone collects second airflow information;

a sixth determination chip configured to determine whether the voice recognition engine is in the second state when the second airflow information is collected; and a fourth generation chip configured to generate fourth prompt information for informing that the voice recognition engine is in the second state when the voice recognition engine is in the second state.

24. The electronic device according to claim 23, further comprising:

a third control chip configured to control the voice recognition engine to enter the second state when the voice recognition engine is not in the second state, after determining whether the voice recognition engine is in the second state.

25. The electronic device according to claim 24, wherein the third control chip comprises:

a third determination sub-chip configured to determine whether the electronic device receives a first operation of touching a preset button; and a first control sub-chip configured to control the voice recognition engine to enter the second state when the first operation is received.

26. The electronic device according to claim 24, wherein the third control chip comprises:

a fourth determination sub-chip configured to determine whether the electronic device detects first airflow information which satisfies a first preset condition; and a second control sub-chip configured to control the voice recognition engine to enter the second state when the first airflow information is detected.

* * * * *